(12) United States Patent
Co et al.

(10) Patent No.: US 8,266,026 B2
(45) Date of Patent: Sep. 11, 2012

(54) DERIVATIVE PRODUCTS

(75) Inventors: Richard Co, Chicago, IL (US); John Labuszewski, Westmont, IL (US); Paul Peterson, Elgin, IL (US); John Nyhoff, Darien, IL (US); Sayee Srinivasan, Elmhurst, IL (US)

(73) Assignee: Chicago Mercantile Exchange, Inc., Chicago, IL (US)

(*) Notice: Subject to any disclaimer, the term of this patent is extended or adjusted under 35 U.S.C. 154(b) by 0 days.

(21) Appl. No.: 11/537,441

(22) Filed: Sep. 29, 2006

(65) Prior Publication Data

US 2008/0082437 A1 Apr. 3, 2008

(51) Int. Cl.
*G06Q 40/00* (2012.01)
(52) U.S. Cl. ............... 705/35; 705/36 R; 705/37; 705/38
(58) Field of Classification Search ............... 705/35–38
See application file for complete search history.

(56) References Cited

U.S. PATENT DOCUMENTS

| | | | |
|---|---|---|---|
| 6,304,858 B1 * | 10/2001 | Mosler et al. ............. | 705/37 |
| 6,725,201 B2 | 4/2004 | Joao | |
| 2001/0027437 A1 | 10/2001 | Turbeville et al. | |
| 2002/0009964 A1 | 1/2002 | Wolf et al. | |
| 2002/0032586 A1 | 3/2002 | Joao | |
| 2002/0116288 A1 | 8/2002 | Nakajima et al. | |
| 2002/0147670 A1 | 10/2002 | Lange | |
| 2003/0014344 A1 | 1/2003 | Chacko et al. | |
| 2003/0023527 A1 | 1/2003 | Wilce et al. | |
| 2003/0023528 A1 | 1/2003 | Wilce et al. | |
| 2003/0023539 A1 | 1/2003 | Wilce et al. | |
| 2003/0093347 A1 | 5/2003 | Gray | |
| 2003/0115128 A1 | 6/2003 | Lange et al. | |
| 2003/0120568 A1 | 6/2003 | Chacko et al. | |
| 2003/0224854 A1 | 12/2003 | Joao | |
| 2003/0236738 A1 | 12/2003 | Lange et al. | |
| 2004/0024692 A1 | 2/2004 | Turbeville et al. | |
| 2004/0030638 A1 | 2/2004 | Dwin | |
| 2004/0039972 A1 | 2/2004 | Chung | |
| 2004/0083116 A1 | 4/2004 | Joyce | |
| 2004/0111355 A1 | 6/2004 | Hirani | |
| 2004/0111358 A1 | 6/2004 | Lange et al. | |
| 2004/0117288 A1 * | 6/2004 | Marshall ..................... | 705/36 |

(Continued)

OTHER PUBLICATIONS http://en.wikipedia.org/wiki/Basis_points; Basic Points, Wikipedia, Sep. 2006, retrieved from the internet Sep. 21, 2006.

(Continued)

*Primary Examiner* — Jason M Borlinghaus
*Assistant Examiner* — Hao Fu
(74) *Attorney, Agent, or Firm* — Banner & Witcoff, Ltd.

(57) ABSTRACT

Systems and methods are described for processing and clearing derivatives products with a binary outcome and having a final settlement based on a triggering event. A computer system configured to process and clear derivative products can accept initial and adjusted performance bonds from buyers and sellers, and adjust the market price of the derivative product at intervals. The market price may be adjusted on a mark-to-market basis and through analysis of other information, e.g., the credit rating of a reference entity. As a result of price adjustments, cash flow may be generated between buyers and sellers. The derivative product may pay a predetermined final settlement amount or percentage upon the triggering of a predetermined event. However, upon expiration of the derivative product, the derivative's market price is settled to zero and the agreement is terminated.

23 Claims, 5 Drawing Sheets

U.S. PATENT DOCUMENTS

| | | | |
|---|---|---|---|
| 2004/0143528 A1 | 7/2004 | Spieler et al. | |
| 2004/0143535 A1 | 7/2004 | Hirani | |
| 2004/0162862 A1 | 8/2004 | Hull | |
| 2004/0172304 A1 | 9/2004 | Joao | |
| 2004/0199450 A1 | 10/2004 | Johnston et al. | |
| 2004/0199459 A1 | 10/2004 | Johnston et al. | |
| 2004/0225598 A1 | 11/2004 | Goldberg et al. | |
| 2004/0230519 A1 | 11/2004 | Parker | |
| 2004/0267660 A1 | 12/2004 | Greenwood et al. | |
| 2005/0010481 A1 | 1/2005 | Lutnick et al. | |
| 2005/0044034 A1 | 2/2005 | Perry et al. | |
| 2005/0080703 A1* | 4/2005 | Chiesa et al. | 705/36 |
| 2005/0080734 A1* | 4/2005 | Lynch et al. | 705/40 |
| 2005/0086156 A1 | 4/2005 | Conroy et al. | |
| 2005/0108128 A1* | 5/2005 | Kastel et al. | 705/35 |
| 2005/0108145 A1* | 5/2005 | Kastel et al. | 705/37 |
| 2005/0144104 A1 | 6/2005 | Kastel | |
| 2005/0149428 A1 | 7/2005 | Gooch | |
| 2005/0197934 A1 | 9/2005 | Finkelstein et al. | |
| 2005/0197937 A1 | 9/2005 | Fanous et al. | |
| 2005/0199452 A1 | 9/2005 | Ward et al. | |
| 2005/0216384 A1* | 9/2005 | Partlow et al. | 705/35 |
| 2005/0234792 A1* | 10/2005 | Gagnon et al. | 705/36 |
| 2006/0010056 A1 | 1/2006 | De La Motte | |
| 2006/0036534 A1 | 2/2006 | Hirani | |
| 2006/0036535 A1 | 2/2006 | Hirani | |
| 2006/0059065 A1* | 3/2006 | Glinberg et al. | 705/35 |
| 2006/0059067 A1 | 3/2006 | Glinberg et al. | |
| 2006/0143099 A1 | 6/2006 | Partlow et al. | |
| 2006/0155638 A1 | 7/2006 | De La Motte | |
| 2006/0253355 A1 | 11/2006 | Shalen | |
| 2006/0253359 A1 | 11/2006 | O'Callahan | |
| 2006/0253368 A1 | 11/2006 | O'Callahan et al. | |
| 2006/0282355 A1* | 12/2006 | Canezin et al. | 705/35 |
| 2008/0010221 A1 | 1/2008 | Co et al. | |
| 2008/0052223 A1 | 2/2008 | Johnson et al. | |
| 2008/0082441 A1 | 4/2008 | Johnston et al. | |
| 2008/0086408 A1 | 4/2008 | Johnson et al. | |
| 2008/0091584 A1 | 4/2008 | Johnson et al. | |
| 2009/0089200 A1 | 4/2009 | Stephen et al. | |

OTHER PUBLICATIONS http://en.wikipedia.org/wiki/Credit_default>swap; Credit default swap, Wikipedia, Sep. 2006, retrieved from the internet Sep. 21, 2006.

http://en.wikipedia.org/wiki/Credit_Default_Swap_Index; Credit Default Swap Index, Wikipedia, Sep. 2006, retrieved from the internet Sep. 21, 2006.

http://en.wikipedia.org/wiki/Derivative_%28finance%29; Derivative (finance), Wikipedia, Sep. 2006, retrieved from the internet Sep. 21, 2006.

http://en.wikipedia.org/wiki/Default_%28finance%29; Default (finance), Wikipedia, Sep. 2006, retrieved from the internet Sep. 21, 2006.

http://en.wikipedia.org/wiki/Hedge_%28finance%29; Hedge (finance), Wikipedia, Sep. 2006, retrieved from the internet Sep. 21, 2006.

http://en.wikipedia.org/wiki/London_Interbank_Offered_Rate; London Interbank Offered Rate, Wikipedia, Sep. 2006, retrieved from the internet Sep. 21, 2006.

http://en.wikipedia.org/wiki/Swap_%28finance%29; Swap (finance), Wikipedia, Sep. 2006, retrieved from the internet Sep. 21, 2006.

IMF Working Paper; "Market-Based Estimation of Default Probabilities and Its Application to Financial Market Surveillance", Jorge A. Chan-Lau, Apr. 2006, WP/06/104, International Monetary Fund.

TSF, Tavakoli Structured Finance, Inc., Introduction to Credit Derivatives Credit Default Swaps, Janet Tavakoli, www.tavakolistructuredfiance.com, Copyright 2001.

Hull, J. and White, A., Valuing Credit Default Swaps I: No Counterparty Default Risk (online), presented Apr. 2000 (retrieved Jan. 7, 2008). Retrieved from the Internet: URL: http://www.rotman.utoronto.ca/~hull/DownloadablePublications/CredDefSw1.pdf>,p. 3, par 2-p[g4, para2: p. 13, para 1-p. 14, para 2.

PCT International Search Report, International Application No. PCT/US07/79398, filed Sep. 25, 2007, mailed Mar. 13, 2008, 10 pages.

PCT International Search Report, International Application No. PCT/US07/79402, filed Sep. 25, 2007, mailed Mar. 13, 2008, 12 pages.

PCT International Preliminary Report on Patentability, PCT/US2007/079398, mailed Sep. 4, 2009, 7 pages.

PCT International Preliminary Report on Patentability, PCT/us2007/079402, mailed Apr. 9, 2009, 8 pages.

European Search Report, PCT/US2007079398, dated Aug. 25, 2011, 6 pages.

\* cited by examiner

| Date | Action | Market Price | Cash Flows |
|---|---|---|---|
| 6/19/06 | Buy one XYZ credit derivative | 200.0 bps | Posts $800 initial margin |
| 6/20/06 | | 198.0 bps | MTM pay of $20 |
| 6/21/06 | | 197.0 bps | MTM pay of $10 |
| 6/22/06 | | 200.5 bps | MTM collect of $35 |
| 6/23/06 | | 203.0 bps | MTM collect of $25 |
| ... | ... | ... | ... |
| 6/8/10 | | 2.0 bps | Accumulated pays of $1,980 |
| 6/9/10 | | 1.0 bps | MTM pay of $10 |
| 6/10/10 | | 0.5 bps | MTM pay of $5 |
| 6/11/10 | | 0.5 bps | - |
| 6/14/10 | final cash settlement | 0.0 bps | MTM pay of $5 |
| | | | TOTAL PAYS = $2,000 |

Figure 3

| Date | Action | Market Price | Cash Flows |
|---|---|---|---|
| 6/19/06 | Buy one XYZ credit derivative | 200.0 bps | Posts $800 initial margin |
| 6/20/06 | | 198.0 bps | MTM pay of $20 |
| 6/21/06 | | 197.0 bps | MTM pay of $10 |
| 6/22/06 | | 200.5 bps | MTM collect of $35 |
| 6/23/06 | | 203.0 bps | MTM collect of $25 |
| ... | ... | ... | ... |
| 4/14/08 | credit concerns mounting | 321.0 bps | Accumulated collects of $1,210 |
| 4/15/08 | | 325.0 bps | MTM collect of $40 |
| 4/16/08 | clearinghouse increases margin requirement to $1,800 from $1,200 | 338.0 bps | MTM collect of $130 Post $600 in additional margins |
| 4/17/08 | | 339.0 bps | MTM collect of $10 |
| ... | ... | ... | ... |
| 9/5/08 | | 4,050.0 bps | Accumulated collects of $38,500 |
| 9/8/08 | | 4,500.0 bps | MTM collect of $4,500 |
| 9/9/08 | | 4,900.0 bps | MTM collect of $4,000 |
| 9/10/08 | | 5,000.0 bps | MTM collect of $1,000 |
| 9/11/08 | credit event declared | 5,000.0 bps | - |
| 9/12/08 | final cash settlement | 5,000.0 bps | - |
| | | | TOTAL COLLECTS = $48,000 |

Figure 4

DERIVATIVE PRODUCTS

FIELD OF THE INVENTION

The present invention relates to financial instruments. In particular, aspects of the invention relate to the processing and clearing of derivatives.

DESCRIPTION OF THE RELATED ART

Credit derivatives are one of the fastest growing segments of the over-the-counter (OTC) derivatives market. Introduced in the mid to late 1990s, the outstanding notional value of credit default swaps (CDSs) has grown to approximately $26 trillion by mid 2006. Credit default swaps are one of the most frequently used type of credit derivatives.

A credit default swap is known and often used as an insurance policy for the holder of a reference obligation (e.g., a corporate bond or other debt obligations of a reference entity). A credit default swap is an agreement between a protection buyer and a protection seller designed to transfer the credit exposure of fixed income products (e.g., debt instruments, etc.) The terms of the agreement require the protection buyer to pay a periodic fee in return for a contingent payment by the protection seller upon a credit event (e.g., bankruptcy, etc.). In addition, many CDSs require the protection buyer to pay the entire fee upfront. This is particularly true in the case of short dated structures. The terms of a typical CDS include information about a reference entity, effective date, termination date, triggering credit events, restructuring clause, basis points, notional amount, and etc. The nature of a CDS is such that each agreement between a protection buyer and protection seller is customized for the particular deal. As a result, creating and processing CDSs can be time-consuming, inefficient, and cumbersome.

Therefore, there exists a need for systems and methods for more conveniently processing and clearing derivatives having a final settlement based on a triggering event.

SUMMARY OF THE INVENTION

Systems and methods are described for more conveniently processing and clearing derivative products with a binary outcome and having a final settlement based on a triggering event. A computer system configured to process and clear derivative products may receive a performance bond (or margin) deposit from a protection buyer and protection seller of a derivative product. Subsequently, both buyer and seller are required to "mark-to-market" (MTM) and are required to pay any losses or collect any profits with respect to the current market price of the derivative on an interval, e.g., daily basis. The derivative product may call for a final settlement with a binary outcome, i.e., the final settlement price will be established at either some fixed amount, variable (non-zero) amount, or at zero, contingent upon the occurrence of a triggering event. The computer system may update the price of the derivative product at an interval (e.g., daily, periodically, etc.). Cash flow is generated between a protection buyer and a protection seller to reflect the change in the market price of the derivative, i.e., the mark-to-market process. If a predetermined triggering event occurs before an expiration date of the derivative, then the protection seller may pay a predetermined amount, and the agreement is terminated.

In another embodiment in accordance with aspects of the invention, a damage recovery rate of a derivative product may determine the final settlement of the derivative based on a predetermined fixed percentage or amount, such as 60% of the notional value, or based on other rules/criteria. For example, the early final settlement of a derivative agreement may be applied at a variable amount that is calculated using a predetermined formula.

Of course, the methods and systems of the above-referenced embodiments may also include other additional elements, steps, computer-executable instructions, or computer-readable data structures. In this regard, other embodiments are disclosed and claimed herein as well. In other embodiments, the present invention can be partially or wholly implemented on a computer-readable medium, for example, by storing computer-executable instructions or modules, or by utilizing computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3 and FIG. 4 show a series of actions, price updates, and cash flows of a credit derivative in accordance with various aspects of the invention;

DETAILED DESCRIPTION

Figure 1:
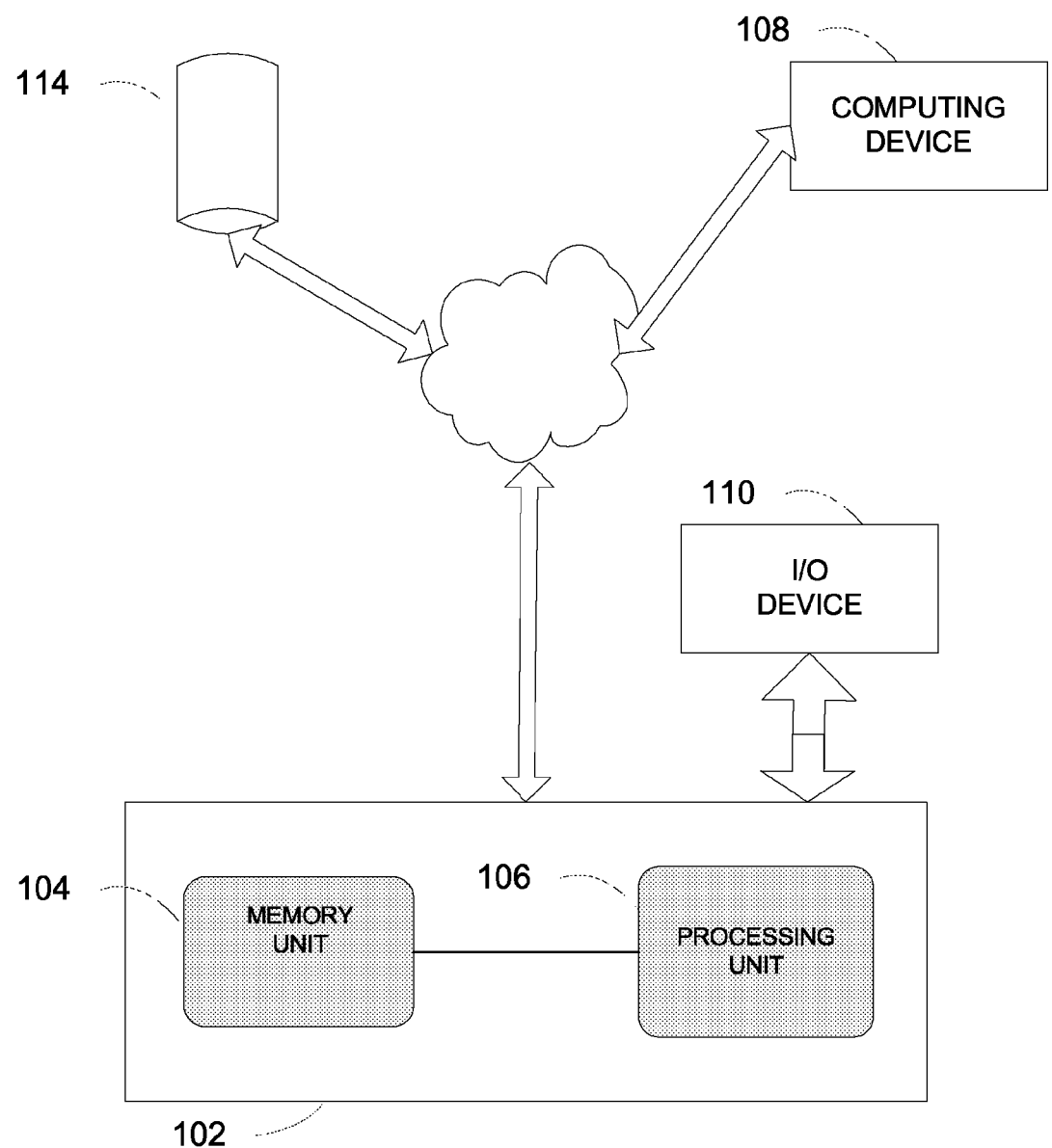
FIG. 1 illustrates a computer network system that may be used to implement aspects of the invention.

An example of a suitable operating environment in which various aspects of the invention may be implemented is shown in FIG. 1. The operating environment is only one example of a suitable operating environment and is not intended to suggest any limitation as to the scope of use or functionality of the invention. The processing unit 106 of computer system 102 executes computer-executable instructions in accordance with aspects of the invention. Memory unit 104 may store computer-executable instructions, which are executed by the computer system 102. The computer-executable instructions may be comprised of modules in accordance with aspects of the invention.

The computer system 102 may have one or more input/output devices 110 (e.g., keyboard, mouse, voice automation, screen, kiosk, handheld computing device display, voice, etc.). Database 114 may be a third-party database containing, for example, credit rating information or other information useful in determining the risk associated with a debt instrument. The database 114 may be connected through wired or wireless communication networks to the computer system 102. Computing device 108 may be a laptop computer, handheld computing device, or any other mobile computing device. In one embodiment in accordance with the invention, a user of computing device 108 can remotely communicate via the Internet to computer system 102 at a clearinghouse or exchange. The user may remotely enter orders for agreements offered by the exchange and indicate a bank account to pay margin requirements and receive cash flows from swaps.

Of course, numerous additional servers, computers, handheld devices, personal digital assistants, telephones and other devices may also be connected to exchange computer system 102. Moreover, one skilled in the art will appreciate that the topology shown in FIG. 1 is merely an example and that the components shown in FIG. 1 may be connected by numerous alternative topologies.

Figure 2:
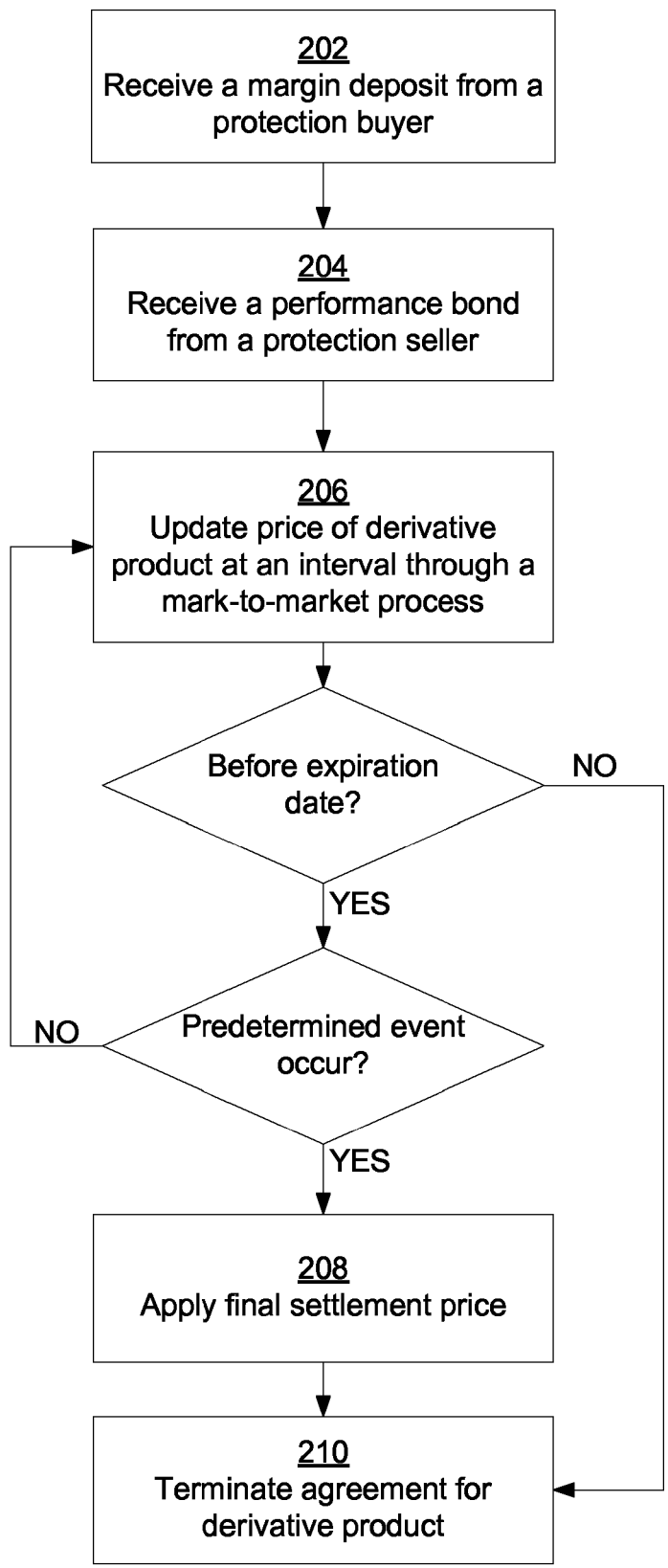
FIG. 2 illustrates a flowchart for an illustrative method for processing and clearing credit derivatives in accordance with aspects of the invention.

Referring to FIG. 2, in accordance with aspects of the invention, an illustrative method is depicted for processing and clearing derivatives having a final settlement based on a triggering event. The method illustrated in FIG. 2 may be implemented in a computer system 102 configured to process and/or clear derivatives. The computer system may be a system located at or in communication with a clearinghouse, such as the Chicago Mercantile Exchange.

Derivatives may be offered and/or formed under a variety of agreements. Examples of derivatives include over-the-counter ("OTC") derivatives and exchange traded derivatives. In accordance with aspects of the invention, the agreement for a derivative discussed in the claimed invention may be an agreement for a type of exchanged traded credit derivative, such as a fixed recovery credit default swap ("CDS"). The CDS market may be divided into three sectors: (i) corporate bonds and loans; (ii) bank credits; and (iii) emerging market sovereigns. A CDS may reference a single credit (e.g., a single bond or single loan) or a basket/portfolio of credits. CDS may reference a custom portfolio of credits agreed upon by the buyer and seller, or a CDS index. The credits referenced in a CDS are known as the "reference entities." Reference entities may be defined to broadly include not only the immediate entity, but to also include successor entities. In addition, the agreement for the credit derivative may be based on a single reference entity.

In accordance with aspects of the invention, a clearinghouse may act as a guarantor of the agreement for the derivative. At least one benefit of an exchange traded derivative, as opposed to the OTC type, is that the derivative is cleared and guaranteed by the clearinghouse. This may promise more interesting capital efficiencies for institutions that may cross-margin one derivative against another derivative. The agreements for the CDSs processed and cleared through a clearinghouse may include, but are not limited to, an expiration date, credit events, price, and/or notional amount.

For example, a user may submit and the computer system 102 may receive (in step 202) a margin deposit of the protection buyer for a particular credit derivative. The protection buyer may be the holder of a debt instrument desiring protection from the risk of default or other triggering events. A credit derivative may be used to enable the debt holder to alleviate the risk of default from the debt instrument. The protection buyer may be the issuer of the debt (e.g., a bank, hedge fund, venture capitalist, angel investor, etc.) or any person and/or entity interested in obtaining protection from the risk of an occurrence of a credit event.

For example, referring to FIG. 3, a protection buyer may purchase one XYZ credit derivative on June $19^{th}$ at a market price of 200 basis points (see entry 302). Assume for purposes of this example that the XYZ credit derivative has a 4-year term expiring (i.e., maturing) on Jun. 14, 2010 and based upon a notional value of $100,000 triggered by a credit event associated with debt issued by XYZ Corporation. While the price of 200 basis points represents $2,000 (i.e., 2.00% times $100,000), the protection buyer may not be required to pay the entire $2,000 upfront in cash. Rather a clearinghouse that is processing and clearing the credit derivative transactions may require only an initial performance bond (e.g., margin deposit). In this example, the clearinghouse may require the protection buyer to post $800 in an initial performance bond.

Likewise, a user may submit and the computer system 102 may receive (in step 204) a performance bond of the protection seller of the credit derivative. A protection seller may sell (e.g., sell short) a XYZ credit derivative. The computer system 102 may require the protection seller to post an initial performance bond. In some embodiments, the protection seller may be required to post the same amount as the protection buyer (i.e., $800). In other embodiments, the margin amount may be different. In yet other embodiments, no margin amount may be required for special buyers and/or sellers with strong credit, long-standing relationship, or sufficient cash reserves.

The computer system 102 updates (in step 206) the market price of the credit derivative. The market price may be updated at a regular interval, at a predetermined time period, on specified dates or times, or any other now known or later developed convention for updating a market price. Assuming that the reference entity (e.g., XYZ Corporation) is stable throughout the next four years until the expiration (i.e., maturity) date, the market price of the credit derivative may be marked-to-market at zero at the expiration date. For example, a protection buyer may enter into an agreement for a credit derivative (as indicated by entry 302) for a market price of 200 basis points. The next day (i.e., June $20^{th}$) the market price of the credit derivative may be adjusted on a mark-to-market basis to 198 basis points (see entry 304). At least one reason for the decrease in the market price of the credit derivative is because as the maturity date approaches, the amount of time remaining during which a triggering credit event (e.g. bankruptcy) may occur is reduced. In other words, the price of the credit derivative may be based, at least in part, on the total remaining time of the credit derivative. Thus, the market price of the credit derivative may be adjusted to reflect the change in risk exposure.

In addition, the market price of the credit derivative may be adjusted, in accordance with market forces, to reflect changes in the perception of credit risk related to the debt corresponding to the derivative. For example, if the reference entity (e.g., XYZ Corporation) is demoted in credit rating from a Standard & Poor's (S&P) credit rating of AAA (i.e., prime investment grade debt) to a S&P credit rating of BB (i.e., speculative non-investment grade debt), the credit risk related to debt is increased. Ratings agencies such as Moody's, S&P, and Fitch provide credit ratings for corporate names. A credit rating of BBB− or higher is considered investment grade debt. Meanwhile, a corporate debt rated BB+ or lower is considered to be non-investment grade debt (e.g., high yield bonds, junk bonds, etc.) A corporate debt's rating may be used to establish a credit spread for the relative default or non-payment risk associated with a corporate debt instrument. In one embodiment, credit spreads are a function of credit rating and yield to maturity. A credit spread may be aggregated with the yield on a comparable maturity Treasury security yield to determine the credit-adjusted corporate bond yield. Higher corporate bond credit ratings imply smaller credit spreads. Therefore, XYZ Corporation being demoted in credit rating near June $22^{nd}$ (see entry 306) may increase the market price of the credit derivative. For example, the price of the credit derivative may increase to 200.5 basis points. The final settlement price of a credit derivative may be commensurate with the risk associated with the triggering event (e.g., default, bankruptcy, etc.). The probability that a XYZ Corporation will default is highly correlated to that company's credit rating and is reflected in its updated market price.

In accordance with aspects of the invention, step 206 includes transferring cash flow between the protection buyer and the protection seller based on the price of the credit derivative. In the example embodied in FIG. 3, the update in the market price results in the computer system transferring the $35 from the protection buyer's account into the protection seller's account. Therefore, a clearinghouse may use a computer system 102 to process and clear the current value of the credit derivative. For example, on Jun. 8, 2010 (see entry 308) the protection buyer may have paid a total of $1,980 of the fee towards the credit derivative. However, it isn't until the expiration date (i.e., Jun. 14, 2010) that final cash settlement occurs and the protection seller receives his total $2,000 fee for taking on the credit risk exposure of the credit derivative (see entry 310). At that time (step 210), the agreement for the credit derivative terminates.

On the other hand, a triggering credit event may occur before the expiration date of the credit derivative. In that case, the final settlement price may be applied (in step 208) to the agreement. The protection seller may be required to pay the protection buyer a predetermined fixed amount (e.g., a percentage of the notional value of the derivative product), or a variable amount calculating using a predetermined formula. It will be apparent to one skilled in the art that there exist many different formula for calculating the payout at settlement. For example, referring to FIG. 4, as credit concerns relating to a reference entity (e.g., XYZ Corporation) rise, the market price of the associated credit derivative increases to 321 basis points (see entry 402). The market price increases to reflect the increased probability of a triggering credit event. At this point in time, the protection buyer has collected $1,210 from the protection seller (see entry 402). Commensurate with the increased volatility, the margin requirements may also be increased. For example, the clearinghouse may increase margin requirements from $1,200 to $1,800 (see entry 404). In one example, the buyer and/or seller may be required to post an adjusted performance bond for the derivative product.

The damage recovery rate of a credit derivative corresponds to the amount the protection seller expects to recover in the event of an occurrence of a predetermined credit event. Typically, recovery rate means the recovery of assets by the debt holder (e.g., if a debit is defaulted upon, the recovery rate is 40% if upon liquidating the assets only 40 cents on the dollar are recovered.) Upon the occurrence of a predetermined credit event, the final settlement price may be fixed at a predetermined amount/percentage, and both buyer and seller may be marked-to-market to that amount. The predetermined amount/percentage may, for example, be sixty percent of the notional value of the credit derivative. In that example, the sixty percent is the damage recovery rate of the credit derivative. Alternatively, the credit derivative product may be configured with a variable damage recovery rate of the credit derivative to be calculated at the occurrence of a triggering event. For example, the damage recovery rate may be set at the difference between the par value and the market price of a defaulted debt instrument of the reference entity.

For example, the timeline of the credit derivative illustrated in FIG. 4 shows that a credit event is declared on Sep. 11, 2008 (see entry 406). After the declaration of the credit event, a final cash settlement occurs. In the illustrative credit derivative of FIG. 4, the final cash settlement occurs on the following day (i.e., Sep. 12, 2008). In one embodiment, the final cash settlement may occur on the same day or on some subsequent day. In this example, the credit derivative has an assumed fixed damage recovery rate of 50%. Therefore, the final settlement price is established at 50% of the $100,000 notional value of the instrument. In addition, in one embodiment in accordance with aspects of the invention, the protection buyer's recovery is reduced by the initial fee of the credit derivative. In the example depicted in FIG. 4, the protection buyer collected an aggregated total of $48,000 (received through the accumulated daily mark-to-market process) because his recovery of $50,000 is reduced by the 200 basis points he was required to pay for the credit derivative. Notice that by the time the final settlement occurs in step 208, the protection buyer has already effectively received from the protection seller the entire (or almost the entire) $48,000 through the mark-to-market process.

In accordance with aspects of the invention, examples of predetermined triggering credit events include, but are not limited to, bankruptcy, obligation acceleration, obligation default, failure to pay, debt repudiation, moratorium, and restructuring. Other examples and descriptions of credit events may be found in by one skilled in the art in the 2003 International Swaps & Derivatives Association (ISDA) Credit Derivative Definitions booklet. For example, a "bankruptcy" event may imply that the reference entity for the credit derivative has become insolvent or lacks the financial capacity to meet its debt obligations. A "failure to pay" event may imply that the reference entity for the credit derivative simply fails to make a scheduled interest or principal payment. A "debt restructuring" event includes a scenario where the seniority of a payment due to the holder of the reference entity has been degraded. An "obligation default or acceleration" event may occur when a debt covenant(s) for the reference entity has been violated, thereby making the debt obligation come due prior to the original maturity date. A "debt payment moratorium" event may arise when the reference entity refuses to make scheduled debt service payments.

Although the market price of credit derivatives may be variable and changed in accordance with market forces on a continuous basis, the clearinghouse may measure and record the prices on a regular basis for risk management and the MTM process. For example, a computer system 102 at a clearinghouse may be configured to adjust the recorded market price of a credit derivative on an hourly basis.

In addition, one skilled in the art after a thorough review of the teachings disclosed herein will appreciate that examples have been provided for credit derivatives, the invention is not so limited. The invention may be implemented to enable exchange-trade derivatives of any type regarding any subject matter. In one example, triggering events may include an outcome or range of outcomes for an economic or agricultural report and/or factor (e.g., if the November release of non-farm payrolls exceeds 200,000 jobs before an expiration date, then a final settlement may be triggered). In yet another example, a price or range of prices for a financial instrument, security or commodity may act as triggering events for derivatives in accordance with aspects of the invention (e.g., if Japanese yen futures close above a certain price at any point prior to an expiration date, then a final settlement may be triggered). In another example, triggering events may be based on weather events and/or reporting including, but not limited to, temperature, precipitation, and/or windspeed (e.g., if the windspeed measured at Miami airport exceeds 90 miles per hour before the expiration date, then a final settlement may be triggered). In one example, derivatives may be exchange-traded that correspond to the risk of a hurricane event occurring during a certain period of time. In yet another example, triggering events may be aligned with indexes, such as a housing index, a commercial real estate index, and others. One skilled in the art will appreciate after thorough review of the teachings disclosed herein that numerous other indexes and/or factors may be used for triggering events.

Figure 5:
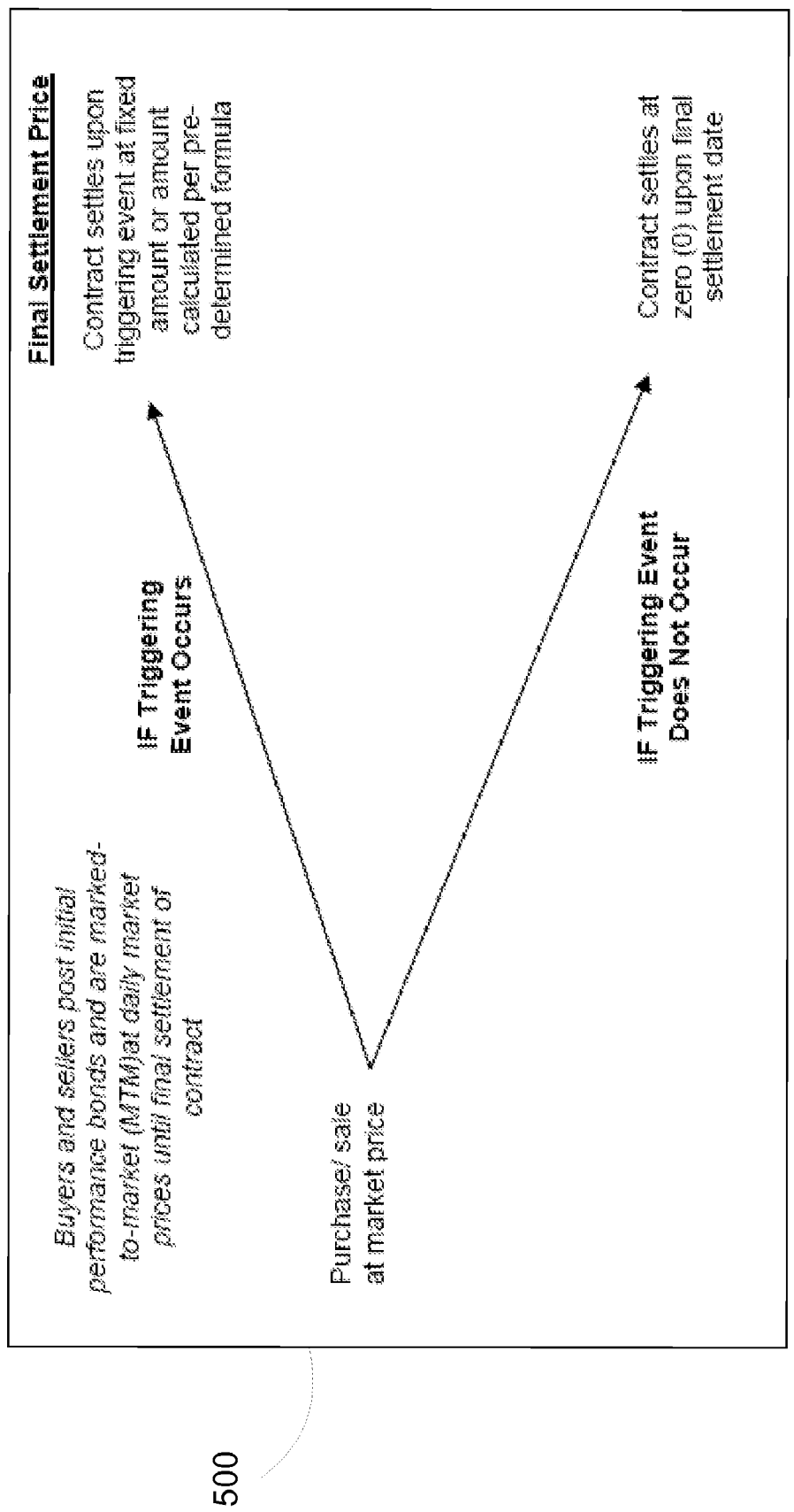
FIG. 5 illustrates a binary outcome derivative product with a futures-style bookkeeping treatment.

FIG. 5 illustrates the binary outcomes 500 possible with a derivative in accordance with aspects of the invention. A buyer may purchase a derivative configured with a binary outcome and having a final settlement based on a triggering event. As explained above, the triggering event may be based on any of a number of things. In addition, the triggering event may be based on a combination of things (e.g., windspeed at Miami airport and precipitation). If the triggering event occurs, the derivative settles at a final settlement price. If the triggering event does not occur, the derivative settles at zero upon the final settlement date (i.e., upon expiration). A derivative with a binary outcome in accordance with aspects of the invention may use futures-style bookkeeping techniques.

Figure 6:
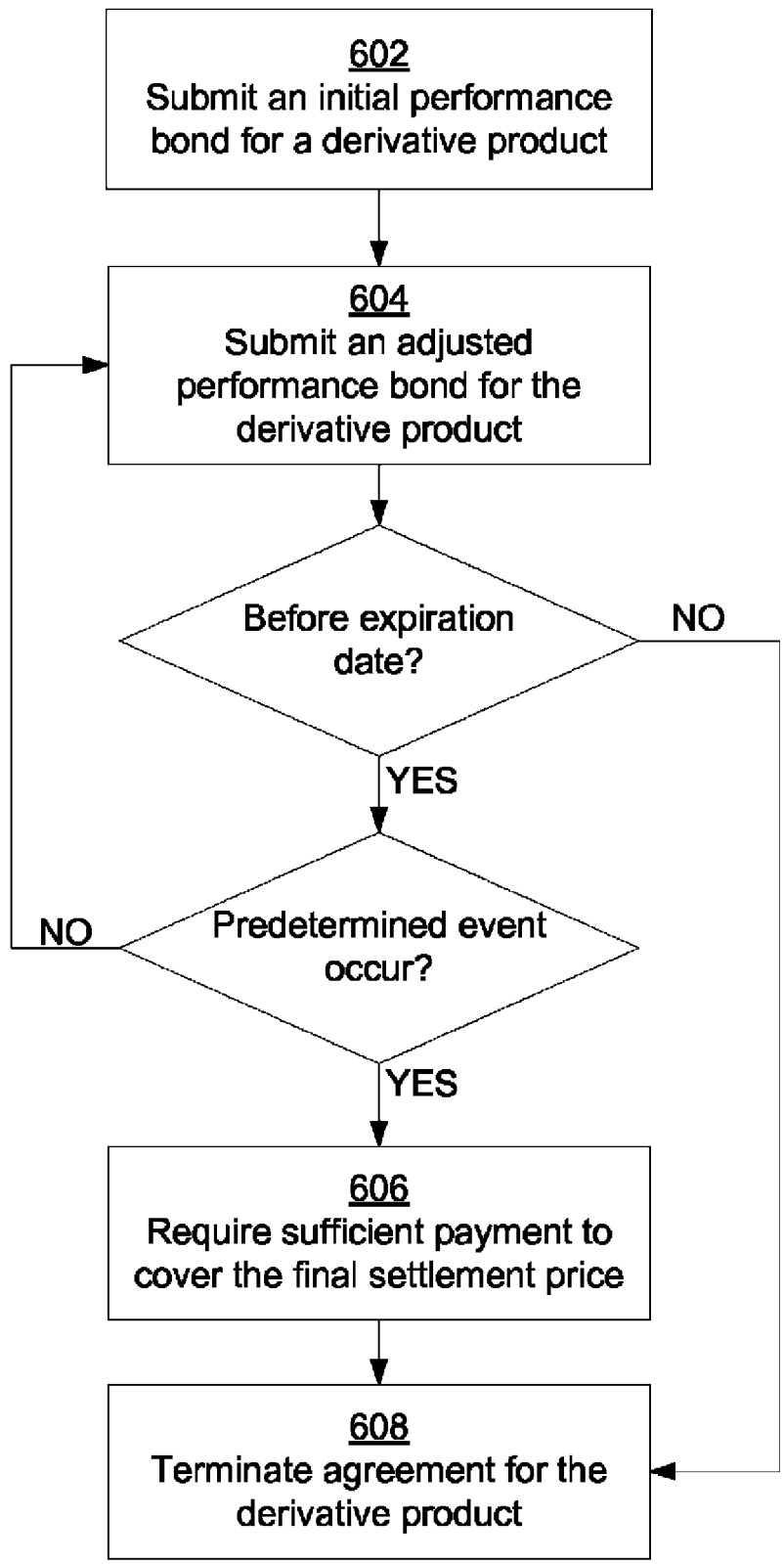
FIG. 6 illustrates a method for purchasing an exchange traded derivative product using a computer system in accordance with aspects of the invention.

FIG. 6 illustrates a method for purchasing an exchange traded derivative product using a computer system. The exchange traded derivative product may be a credit default swap in one embodiment. In step 602, a customer, trader, or other user may submit an initial performance bond for the derivative product. The bond may be received (e.g., receive account number and process) by a computer system that processes and clears an agreement for the derivative product. The computer system may update the price of the derivative product at an interval through a mark-to-market process, and as appropriate, may change the margin requirements for the derivative products. The user may then submit (in step 604) an adjusted performance bond for the derivative product for receipt by the computer system. If a predetermined triggering event occurs (e.g., default) before an expiration date, then the user may be required to submit (in step 606) sufficient payments to cover the final settlement price of the derivative product. If no predetermined triggering event occurs before the expiration date, then the agreement may be terminated (in step 608) at a zero final settlement price. One skilled in the art will appreciate that many different users and types of users may interact with a computer system in accordance with aspects of the invention described above.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

We claim:

1. A computer-implemented method of processing and clearing an agreement for a derivative, comprising:
   a) receiving, at an electronic interface comprising at least one of an input device and a network interface, an initial performance bond of a protection buyer of a derivative product, wherein the derivative product has a binary outcome;
   b) receiving at the interface a second initial performance bond of a protection seller of the derivative product;
   c) updating a price of the derivative product at an interval through a mark-to-market process using a processing unit in communication with the interface, including transferring a cash flow between the protection buyer and the protection seller based on the price of the derivative product;
   d) adjusting the cash flow including a part of a total fixed fee for the derivative product based on the price of the derivative product such that the fee component of the cash flow of a first interval, a second interval, and a third interval are each different; and
   e) if a predetermined triggering event occurs before an expiration date, then requiring sufficient funds to cover a final settlement price of the agreement and terminating the agreement.

2. The method of claim 1, further comprising: f) terminating the agreement upon the expiration date before a predetermined triggering event occurs.

3. The method of claim 2, wherein the derivative product is a credit default swap.

4. The method of claim 1, wherein updating the price of the derivative product comprises:
   analyzing a probability that a triggering event will occur; and
   determining a final settlement price commensurate of the risks associated with said triggering event.

5. The method of claim 1, wherein the initial performance bond price is less than the final settlement price.

6. The method of claim 1, wherein the final settlement of the agreement is applied at a predetermined fixed amount.

7. The method of claim 6, wherein the predetermined fixed amount is a percentage of a notional value of the derivative product.

8. The method of claim 1, wherein the price of the derivative product is based on a total remaining time until expiration of the derivative product.

9. The method of claim 8, wherein the price of the derivative product is zero at a time of expiration of the derivative product.

10. The method of claim 1, wherein updating the price of the derivative product at an interval is performed daily through a mark-to-market process.

11. The method of claim 1, wherein the predetermined triggering event is a credit event.

12. The method of claim 11, wherein the credit event is based on at least one of the following: bankruptcy, obligation acceleration, obligation default, failure to pay, debt repudiation, moratorium, and restructuring.

13. The method of claim 1, wherein the predetermined triggering event is a weather event.

14. The method of claim 13, wherein the weather event is based on at least one of the following: temperature, precipitation, and windspeed.

15. The method of claim 1, wherein the predetermined triggering event is based on at least one of the following: economic factor, agricultural factor, financial instruments, security, commodity, housing index, and real estate index.

16. The method of claim 1, wherein the agreement for a derivative product is an agreement for a credit default swap, and a clearinghouse acts as a guarantor of the agreement for the derivative product.

17. The method of claim 16, wherein the agreement for a credit derivative is based on a single reference entity.

18. The method of claim 1, wherein the agreement for a derivative product is an agreement for a credit default option, and a clearinghouse acts as a guarantor of the agreement for the derivative product.

19. A non-transitory computer-readable medium containing computer-executable instructions for performing a method comprising:
   a) receiving an initial performance bond of a protection buyer of a derivative product, wherein the derivative product has a binary outcome;
   b) receiving an adjusted performance bond of a protection buyer of the derivative product;
   c) updating a price of the derivative product at an interval through a mark-to-market process;

d) transferring a cash flow between the protection buyer and a protection seller based on the price of the derivative product;

e) adjusting the cash flow including a part of a total fixed fee for the derivative product based on the price of the derivative product such that the fee component of the cash flow of a first interval, a second interval, and a third interval are each different;

f) if a predetermined triggering event occurs before an expiration date, then requiring sufficient funds to cover a final settlement price of the agreement and terminating the agreement; and g) terminating the agreement upon the expiration date before a predetermined triggering event occurs.

20. The computer-readable medium of claim 19, containing computer-executable instructions for performing a method, wherein the derivative product is a credit default swap.

21. An apparatus for purchasing an exchange traded derivative product using a computer system, comprising:

a processing unit;

an interface comprising at least one of an input device, output device, and network interface;

a memory unit storing computer-executable instructions configured to cause the processing unit to perform a method comprising:

a) submitting, using the interface, an initial performance bond for the derivative product for receipt by a computer system that processes and clears an agreement for the derivative product, wherein the derivative product has a binary outcome and a price, and wherein the computer system updates the price of the derivative product at an interval through a mark-to-market process, including transferring a cash flow between a protection buyer of the derivative product and a protection seller of the derivative product based on the price of the derivative product;

b) adjusting the cash flow including a part of a total fixed fee for the derivative product based on the price of the derivative product such that the fee component of the cash flow of a first interval, a second interval, and a third interval are each different;

c) if a predetermined triggering event occurs before an expiration date, then requiring sufficient payment to cover the final settlement price of the derivative product; and d) if no predetermined triggering event occurs before the expiration date, then terminating the agreement at a zero final settlement price.

22. The apparatus of claim 21, the method further comprising: e) submitting, using the interface, an adjusted performance bond for the derivative product for receipt by the computer system.

23. The apparatus of claim 21, wherein the exchanged traded derivative product is a credit default swap.

* * * * *